(12) United States Patent
Li et al.

(10) Patent No.: US 6,772,180 B1
(45) Date of Patent: Aug. 3, 2004

(54) DATA REPRESENTATION SCHEMA TRANSLATION THROUGH SHARED EXAMPLES

(75) Inventors: Chung-Sheng Li, Ossining, NY (US); Rakesh Mohan, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/235,793

(22) Filed: Jan. 22, 1999

(51) Int. Cl.[7] .............................................. G06F 17/21
(52) U.S. Cl. ..................................... 707/513; 707/100
(58) Field of Search .............................. 707/100, 103, 707/513

(56) References Cited

U.S. PATENT DOCUMENTS

| | | | |
|---|---|---|---|
| 4,680,705 A | | 7/1987 | Shu ............................ 364/300 |
| 4,951,196 A | | 8/1990 | Jackson ....................... 364/401 |
| 5,187,787 A | * | 2/1993 | Skeen et al. ................. 709/314 |
| 5,699,415 A | * | 12/1997 | Wagner ........................ 380/43 |
| 5,897,622 A | * | 4/1999 | Blinn et al. .................... 705/26 |
| 5,915,259 A | * | 6/1999 | Murata ......................... 707/513 |
| 5,960,200 A | * | 9/1999 | Eager et al. ................... 703/13 |
| 6,018,743 A | * | 1/2000 | Xu ........................... 707/103 R |
| 6,223,168 B1 | * | 4/2001 | McGurl et al. ................ 705/39 |
| 6,243,451 B1 | * | 6/2001 | Shah et al. .................. 370/352 |
| 6,253,254 B1 | * | 6/2001 | Erlenkoetter et al. ......... 707/10 |

\* cited by examiner

Primary Examiner—Greta Robinson
Assistant Examiner—S R Pannala
(74) Attorney, Agent, or Firm—Thu Ann Dang

(57) ABSTRACT

A method for translating data from one representation or schema to another representation or schema. Example data encoded in both the schemas is used to generate a translator. This translator is then used for automatically translating data from one schema to another. The translator is computed by finding corresponding paths for matched data elements. When new data is presented in one schema, the translator then gives the translation for the paths of data elements in the data. A translated data is then constructed by using these translated paths. Possible applications in the Internet domain, include but are not limited to: EDI; search engines; content ingestion; content customization; data delivery; and data retrieval. Specific examples are shown for generating a translator and translating data between various schema including HTML, XML and extensions thereto such as SpeechML.

47 Claims, 14 Drawing Sheets

| 572* pA | pB 582* |
|---|---|
| 1410  a.b.c* | p.q.r*  1420 |
| 1430  a.b.c*.d* | p.q.r*.s.t*  1440 |
| 1450  a.e*.f* | p.u*  1460 |
|  |  |
|  |  |
| 140  TRANSLSTOR TABLE | |

# DATA REPRESENTATION SCHEMA TRANSLATION THROUGH SHARED EXAMPLES

FIELD OF THE INVENTION

The present invention is related to methods and apparatus for exchanging data between parties using different schemas to represent the data. More specifically, the invention is related to an apparatus and a set of processes that automatically translate between two different data representation schemas through the use one or more shared examples.

1. Background

In any applications involving the processing of data that is not centralized, one entity will have to send or receive data from other entities. The fundamental challenge is that different entities may use different schemas (or formats) to represent data. On the Internet, this data is often described using a structured markup language such as eXtensible Markup Language (or XML). The definition of the format of the data described using XML is captured by an associated Data Type Description (DTD). Consequently, the two entities may use different XML DTDs to represent the data formats of the corresponding data.

This invention describes a new solution in which the two entities, by sharing one or more examples, are able to perform the translation between the two schemas automatically.

The possible applications, in the Internet domain, include but are not limited to: EDI; search engines; content ingestion; content customization; data delivery; and data retrieval.

2. Statement of Problems With the Prior Art

There are some existing ways of solving this schema translation problem:

1. Explicit Translation Rules: In this case, translation rules between two schema are manually derived and coded (i.e., software). A new set of schema requires new translation rules. Furthermore, writing software is time consuming and expensive.

2. Standardized Schemas: In this case, both entities use a standard schema. Examples include numerous data formats such as Hypertext Markup Language (HTML), and Channel Data Format (CDF). Nevertheless, agreeing on a common schema is time consuming and difficult.

In summary, the existing techniques for solving the schema translation problem are time consuming and expensive. This does not allow them to be deployed in scenarios where the translation is required for short engagements.

ADVANTAGES & OBJECTIVES OF THE INVENTION

The present invention includes the advantages of:

1. No translation programs need to be written.

2. No standard schemas have to be agreed upon.

3. Examples may be needed anyway to explain the schemas.

An objective of this invention is to provide a mechanism for translating data between different representation schemas by automatic and simple means.

SUMMARY OF THE INVENTION

In accordance with the aforementioned needs, the present invention is directed to a method, computer program product or program storage device for software for automatically generating a translator adapted for translating data between different representation schemas using the translator.

An example of a method for data representation schema translation having features of the present invention, comprises the steps of: identifying data encoded in a first data representation schema; converting the data encoded in the first data representation schema to an encoding in a second data representation schema; and automatically generating a translator based on common data encoding, in response to the identifying and converting steps, wherein the translator is adapted for translating data between said first data representation schema and said second data representation schema.

Another example of a method for data representation schema translation having features of the present invention, comprises the steps of: identifying one or more shared examples encoded in two data representation schemas; and automatically generating a translator based on the shared examples, wherein the translator is adapted for translating data between said two data representation schemas.

One embodiment of the present invention comprises the further steps of: parsing data in said one or more shared examples into trees, each tree representing one of the data representation schemas; generating a path table for each tree, in response to the parsing step; wherein the step of automatically generating the translator comprises the step of generating a translation table from path tables generated for each tree.

In a preferred embodiment, the data representation is in the form of a tree and the same data example is encoded in the two different schemas, sA and sB. Let the example data D={x1,x2, ... ,xi, ... xn} be encoded as dA and dB in sA and sB, respectively. Each element xi in D, represented in schema sj, has a unique path pji from the root to xi.

We build a path conversion table T that has an entry {pAi, pBi} for each xi in D. This can be done, for example, by making a table of {xi, pAi} for dA in sA and {xi, pBi} for dB in sB. Rows of these tables with common element xi are merged to generate T.

When a new data Y={y1, y2, ... ,yi, ... ,ym} is encoded in sA as yA, and needs to be converted to yB represented in sB, we first compute the path pAi for each yi in Y. Then we use the path conversion table T to look up the entry with a matching path value in the first column which gives the resulting path pBi for yi in yB via the second column of T. We incrementally construct the tree for yB by adding the data item yi at path pBi in yB.

The path conversion table T acts as an automatic program for converting data between the two schemas sA and sB.

Alternatively, when the representation is in the form of a graph, a method is used to compute unique paths, for example, depth-first traversal. The depth-first traversal of a rooted graph will give us tree composed of the tree edges and the nodes, thus reducing the graph to an equivalent tree (reference "Knuth"). Other data representations can be converted to trees or graphs.

The path computed may be augmented by storing at each node along the path, its position among its siblings. This augmented path allows us to preserve ordering within siblings.

The example D, or a set of examples {D} needs to exercise each possible path p that is to be encountered in subsequent data exchanges. These paths p are the non augmented paths. Differences in augmented path can be automatically handled by using machine readable schemas sA and sB or, in the absence of schemas, using heuristics, such as defaults for repetitions of nodes (for example, the default could be that each node appears zero or more times).

Depending on the nature of the machine readable schemas sA and sB, data (format) conversions that can be deduced automatically from the two schemas, can also be added to this schema conversion process.

BRIEF DESCRIPTION OF THE DRAWINGS

These and other features and advantages of the present invention will become apparent from the following detailed description, in conjunction with the accompanying drawings, wherein.

DETAILED DESCRIPTION

Figure 1:
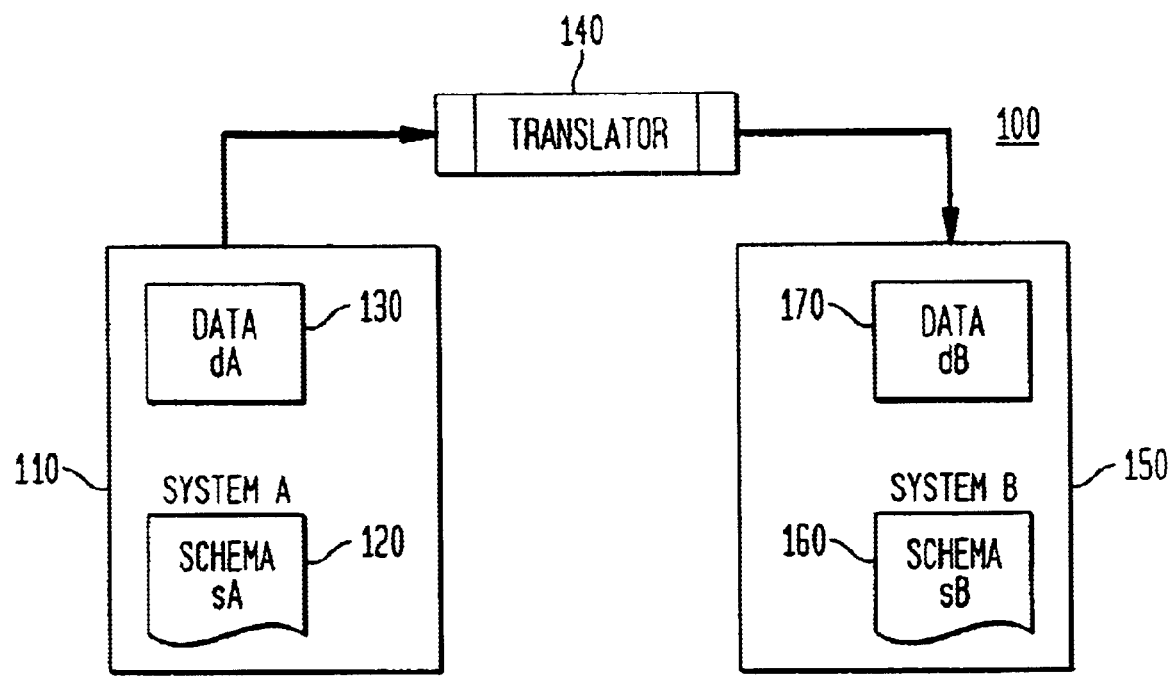
FIG. 1 shows a block diagram of a network where data from one system is being translated to be used by a second system.

FIG. 1 shows an example of a typical application setup (100) for this invention. As depicted, the setup (100) includes a system A (110) which has a data representation schema sA (120) and data dA (130) represented in that schema. This data (130) can be requested by another computer system B (150). This data dA (130) may be stored at or generated by the system A (110). Another computer system B (150) uses a data representation schema sB (160). System A and system B may reside on the same or different computers.

System A (110) sends data to system B (150), possibly in reply to a request from system B (150). As this data dA (130) is represented in schema A (120), it has to be translated to data dB (170) represented in schema B (160), so that system B (150) can use it. Thus, a translator (140) is required to translate data from schema sA (120) to schema sB (160). The present invention includes features for automatically generating the translator (140) given some example data that is represented in both schema sA (120) and schema sB (160).

The translator (140) may reside on the same computer as system A (110) or system B (150) or a different computer. Those skilled in the art will appreciate that the shared examples can be augmented by programs attached to individual parts of the examples, or augmented by further meta-data including statistics and/or properties.

The data dA (130) and dB (170) are preferably represented as trees (reference "Knuth"), or in another format that can be reduced to a tree. All the data values are stored at leaf nodes (reference "Knuth"), i.e., nodes with no outgoing links. For example, the data may be formatted as HTML (reference "W3C"), SGML (reference "ISO") or XML (reference "W3C"). The representation schemas may be explicit or implicit. For example, if the data is formatted in XML or SGML, they may have explicit Document Type Definitions (DTDs, reference "W3C") as their schemas or no DTDs, in which case they have implicit schemas. For XML specifically, the internal nodes are the element and the attributes. The element content and attribute values are stored in leaf nodes pointed to by the containing element or attribute. A number of XML parsers are capable of generating such a tree (reference "W3C") representation. Those skilled in the art will appreciate that the present invention is applicable to data representation schemas that are machine-readable schemas for XML including: DTD; DCD; and XML-data schema (reference "W3C").

Figure 2:
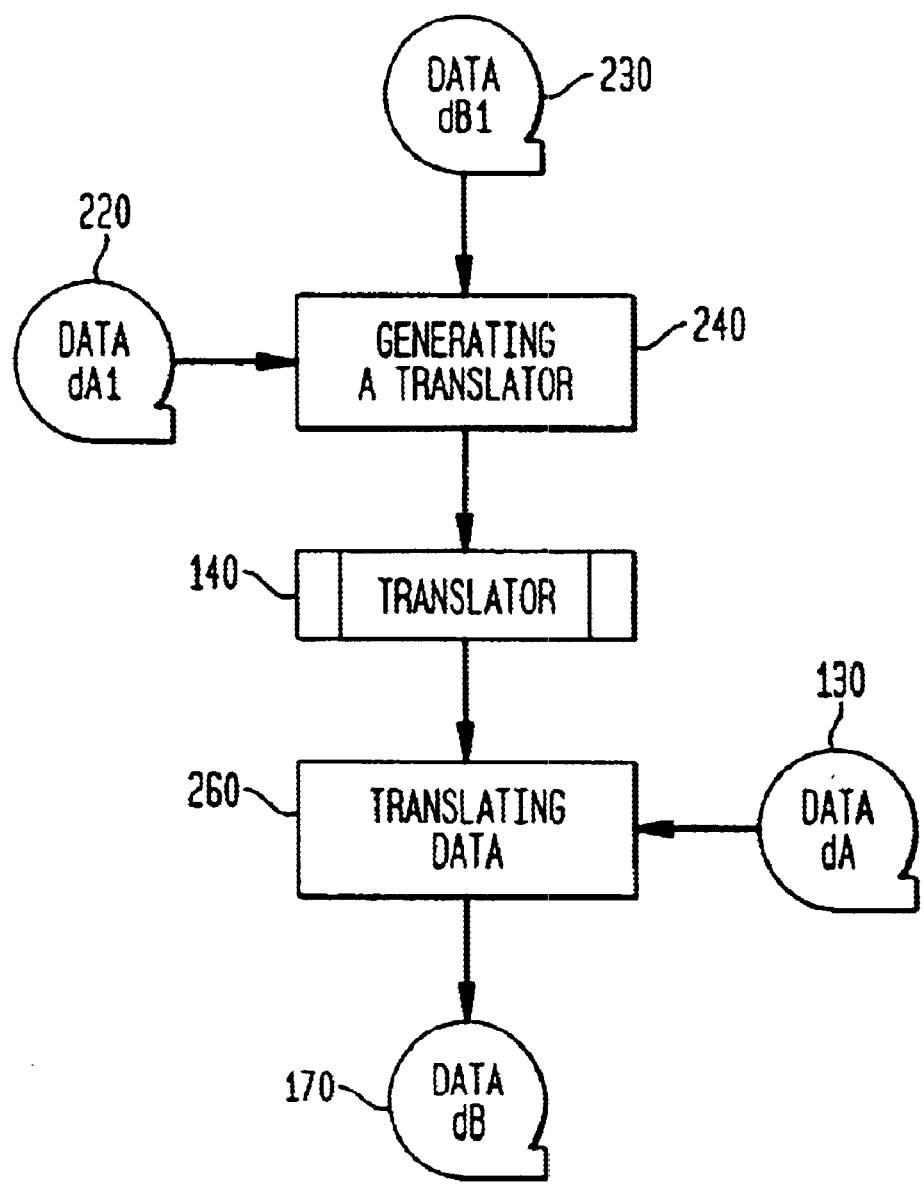
FIG. 2 shows a flowchart of the process of creating a translator from examples and using it to translate data items.

FIG. 2 depicts an example of a logic flowchart for generating a translator (140) and for using the generated translator. As depicted, example data dA1 (220) is encoded in schema sA (FIG. 1, 120) and example data dB1 (230) is encoded in schema sB (FIG. 1, 160). In step 240, the example data dA1 (220) and dB1 (230) are used to generate a translator (140). In step 260, this translator (140) is then used to translate data dA (130), represented in schema sA (120), to data dB (170) represented in schema sB (160). This translator (140) will provide the correct translation as long as the schemas sA (120) and sB (160) do not change. The step 240 of generating a translator and the step 260 of translating data using a translator are similar for all data representation schemas. The generated translator (140) is specific to the two schemas sA (120) and sB (160) being translated.

Figure 3:
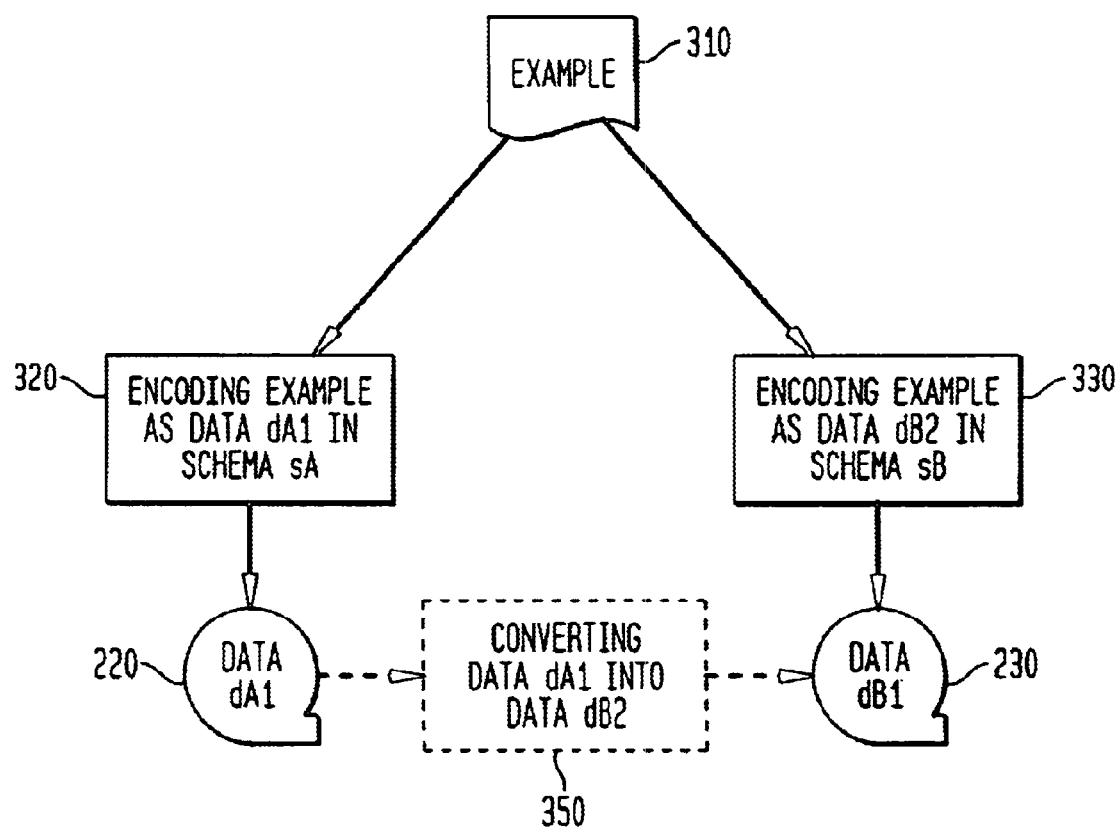
FIG. 3 shows a flowchart for the creation of example data.

FIG. 3 depicts an example of a logic flowchart for generating the example data. As depicted, an example (310) describing the data in a commonly understood language, such as English or HTML, is encoded in step 320 as example data dA1 (220) in schema sA (120) and is also encoded in step 330 as example data dB1 (230) in schema sB (160). Alternatively, an example data dA1 (220) in schema sA (120) is translated (350), possibly manually, to example data dB1 (230) in schema sB (160). When there is an explicit common example 310, a representation dA1 (220) can be created at system A (110) without requiring knowledge of any other system, and similarly, its representation dB1 (230) can be created at system B (150) without any knowledge of any other system. These data representations may be created manually. In the absence of an explicit example (310), the data representation dA1 (220) has to be translated (350) to the data representation dB1 (230) by other means, possibly manually by somebody who understands both dA1 (220) and schema sB (160).

Figure 4:
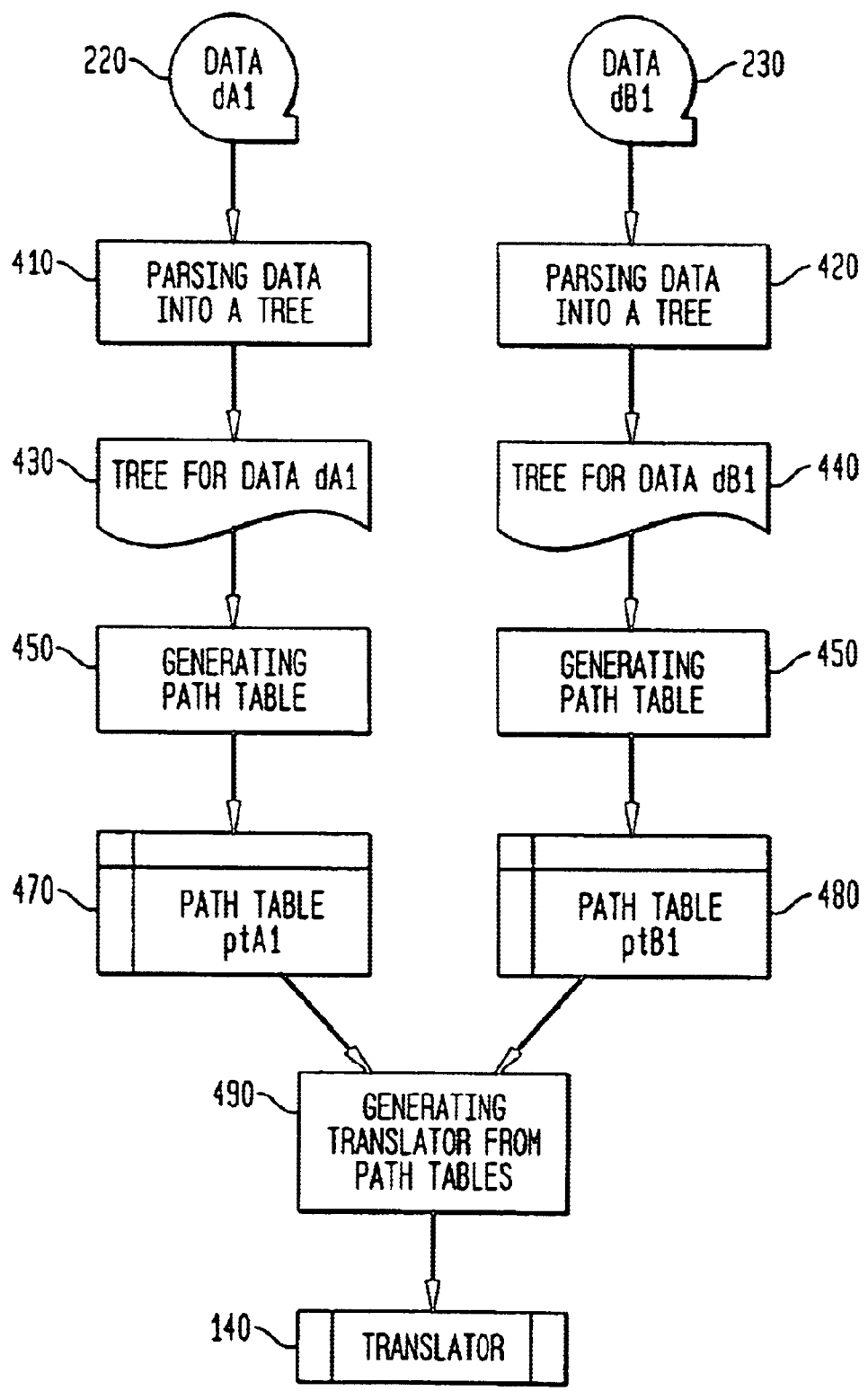
FIG. 4 shows a flowchart for creating a translator using example data items.
Figure 5:
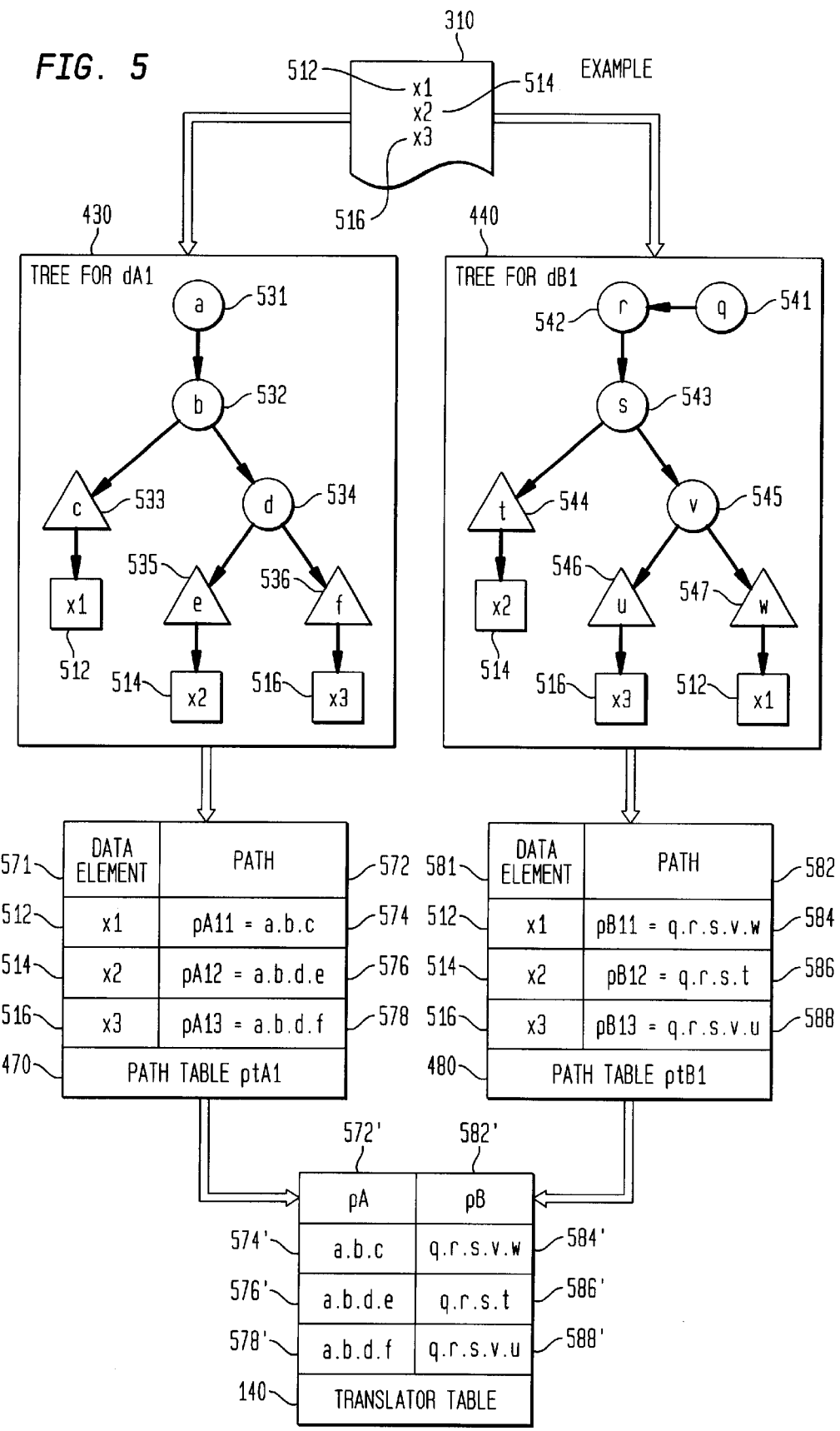
FIG. 5 shows examples of data, trees, path tables and translator tables.

FIG. 4 depicts an example of a logic flowchart for generating a translator. As depicted, the example data dA1 (220) is parsed, in step 410, into a tree (430) (depicted graphically in FIG. 5) and the example data dB1 (230) is parsed, in step 420, into a tree (440) (depicted graphically in FIG. 5). Referring now to FIG. 5, an example (310)

describes data elements x1 (512), x2 (514), x3 (516) and x4 (518). The example data dA1 (220) is parsed, in step 410, into a tree (430), with root node (531). The example data dB1 (230) is parsed, in step 420, into a tree (440), with root node (541). Such parsers (420) are well known in the art.

Referring now to FIGS. 4 and 5, in step 450, the same algorithm is used for generating path tables ptA1 (470) from tree (430) and ptB1 (480) from tree (440). In step 490, the path tables ptA1 (470) and ptB1 (480) are used by a process to generate the translator (140).

Figure 6:
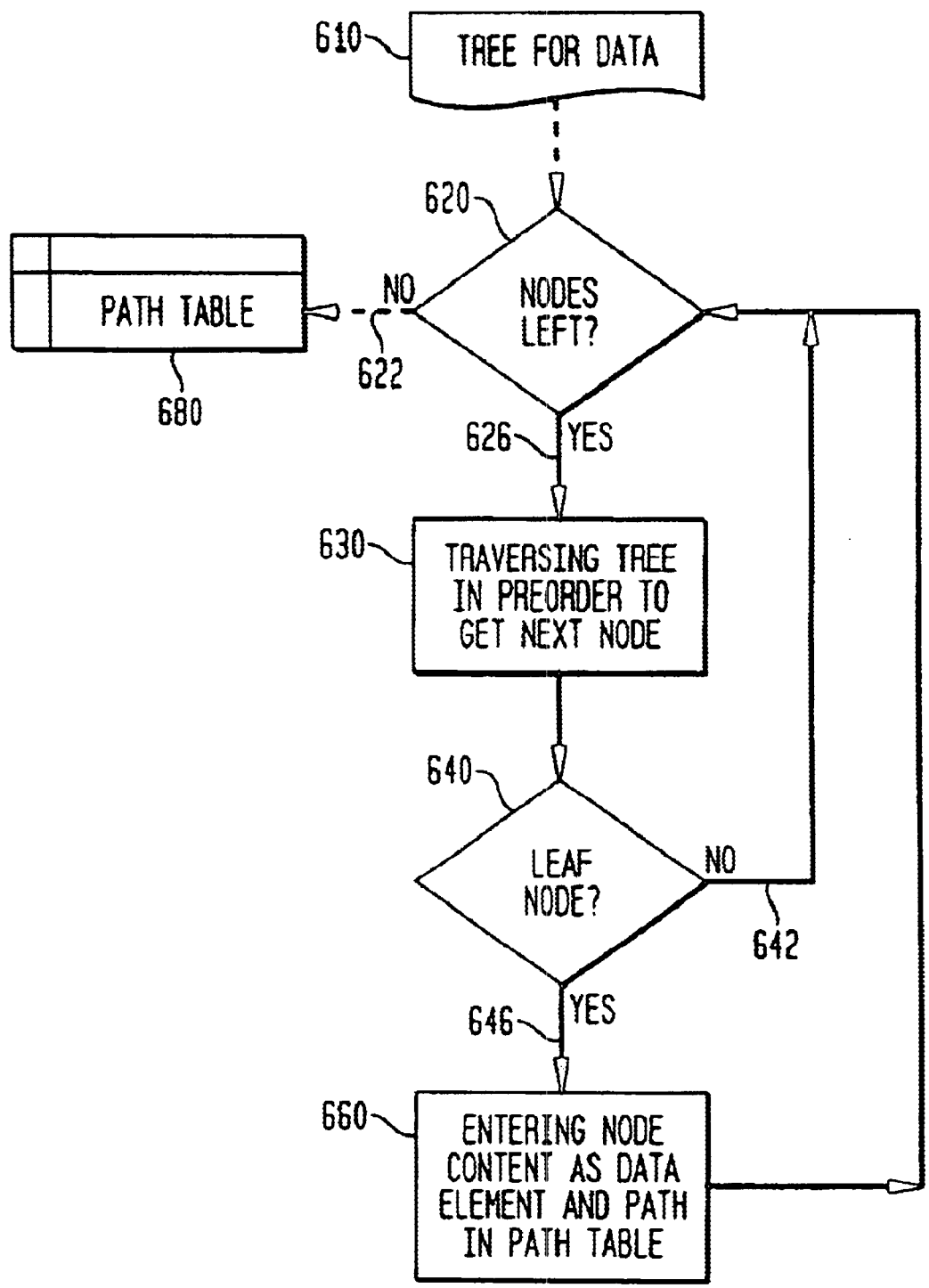
FIG. 6 shows a flowchart of the creation of path tables from trees.

FIG. 6 depicts an example of a logic flowchart for generating a path table (680) (examples of which are depicted graphically in FIG. 5, 470, 480) from a tree (610) (examples of which are depicted graphically in FIG. 5, 430, 440). As depicted, in step 620, it is determined (620) if any nodes are left to be traversed. Since, the traversal is preferably started from the root node, the process initially follows the "yes" (626) link. In step 630, the tree is traversed in a particular order, such as preorder (reference "Knuth"). During the traversal, in step 640, at each new node reached (FIG. 5, 512–547), it is checked whether it is a leaf node (533, 535, 536). Each leaf node is associated with a data element. If the node is a leaf node ("yes" link 646), the data element at the leaf node and the path to the leaf node are entered, in step 660, into the path table (680) (see the examples depicted graphically in FIG. 5, 470, 480). The process then returns to step 620, where it is checked whether any nodes are left to be traversed. If any nodes remain (626), the process repeats at steps 630, 640 and possibly 660. If no more nodes remain (622) then the path table 680 is complete and the process terminates.

Referring again to FIG. 5, the path table generation process traverses the tree (430) for data dA1 (220) and generates path table ptA1 (470). Every time it reaches a leaf node (533, 535, 536), it adds to the path-table ptA1 (470) an entry which includes the associated data element (571) and the path (572) (in the particular traversal) from the root to that leaf node. For example, at the leaf node c (533), the process adds an entry consisting of the data element x1 (512) and the path pA11=a.b.c (574) to the path table ptA1 (470). Similarly, for the leaf-node e (535) it adds an entry with data element x2 (514) and its path pA12=a.b.d.e (576) to ptA1 (470). This process continues until all the leaf nodes of the tree (430) have been reached and entered in the path-table ptA1 (470).

Similarly, the process traverses the tree (440) for dB1 (230) and generates a path-table ptB1 (480). Every time it reaches a leaf node, it adds to the path-table ptB1 (480), an entry which includes the data element (581) and the path (582) (in the particular traversal) from the root to that leaf node. For example, at the leaf node w (547), an entry is added for the data element x1 (512) and the path pB11= q.r.s.v.w (584) to the path table ptB1 (480). Similarly, for the leaf-node t (544) an entry is added for data element x2 (514) and its path pB12=q.r.s.t (586) to ptB1 (480). This process continues until all the leaf nodes of the tree (440) have been reached and entered in the path-table ptB1 (480).

Figure 7:
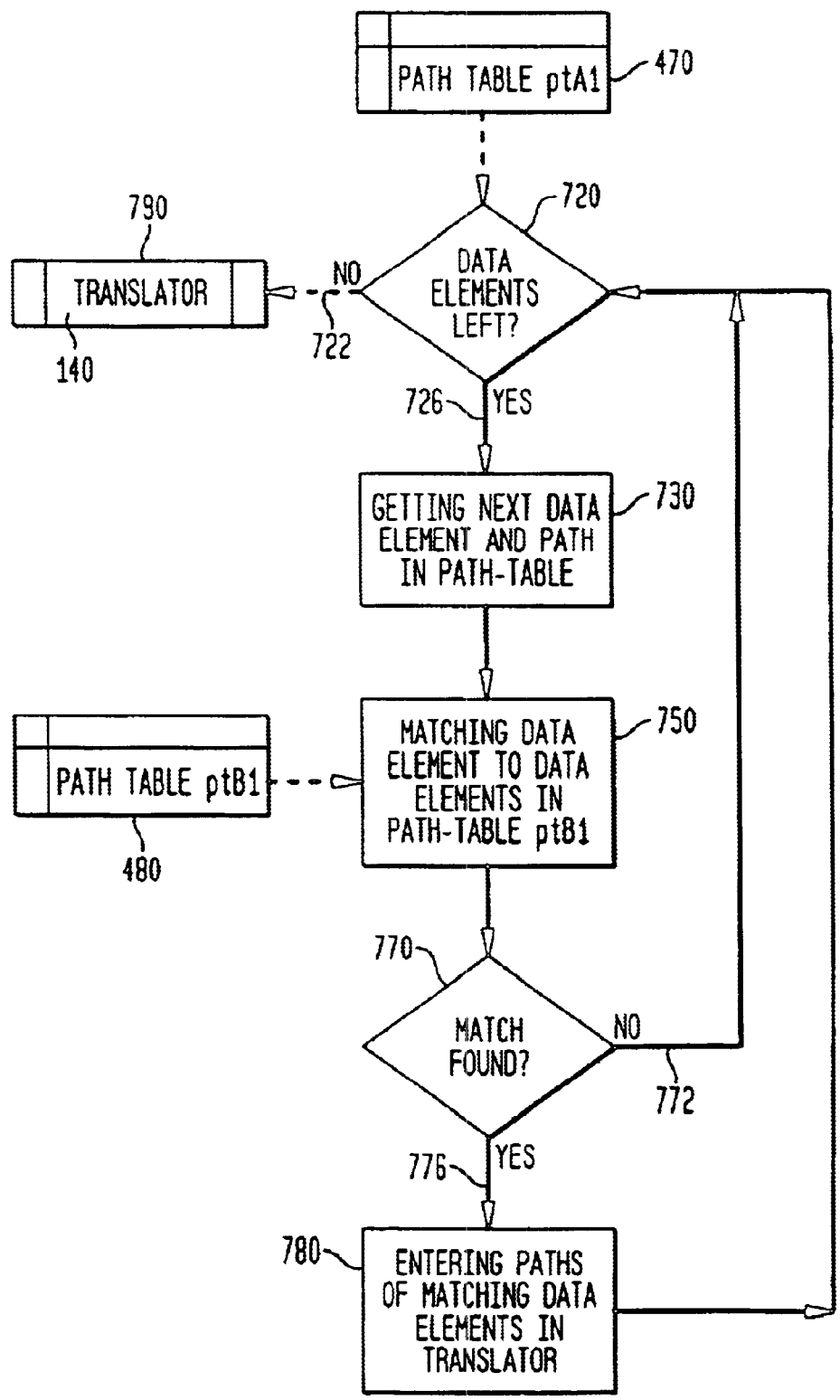
FIG. 7 shows a flowchart of the creation of a translator from two path tables.

FIG. 7 depicts an example of a logic flowchart for generating a translator (FIG. 5, 140) from two path-tables (ptA1 FIG. 5, (470) and ptB1 FIG. 5, (480)). The preferred embodiment of the translator (140) is a table, although one skilled in the art will appreciate that other data structures may be used. Each entry in this translator table (140) includes a path pA (572') from the path-table ptA1 (470) and a corresponding entry for the path pB (582') from the path-table ptB1 (480). As depicted, in step 720, the process starts by checking if any entries in ptA1 (470) remain to be processed. If any entries remain to be processed, the yes (726) link is followed and in step 730, the data element and the path from the next unprocessed entry are obtained. (It is assumed in this example that processing begins with the first entry in ptA1 (470)). In step 750, the data element obtained from ptA1 (470) is matched against data elements in entries in path table ptB1 (480). In step 770, if a match is found (776), the path from the entry in ptA1 (470) and the path from the matching entry in ptB1 (480) are entered in the translator (140) table, in step 780. For example, in FIG. 5, the data element x1 (512) has the path a.b.c (574) in ptA1 (470) and the path q.r.s.v.w (584) in ptB1 (480), so an entry comprising a.b.c (574') and q.r.s.v.w (584') is entered in the translator (140) table. Data element x2 (514) has path a.b.d.e (576) in ptA1 (470) and path q.r.s.t (586) in ptB1 (480) so an entry comprising a.b.d.e (576') and q.r.s.t (586') is added to the translator (140) table. Referring again to FIG. 7, when no more unprocessed entries are left (722) in path table ptA1 (470), the translator (140) table is complete and the process terminates, in step 790.

The translator (140) table needs to be constructed only once. Once constructed, the translator (140) table, and an associated process (FIG. 2, 260 and described in more detail with reference to FIG. 8), can automatically translate data items from schema sA (120) to schema sB (160) as long as neither of the two schemas change.

Figure 8:
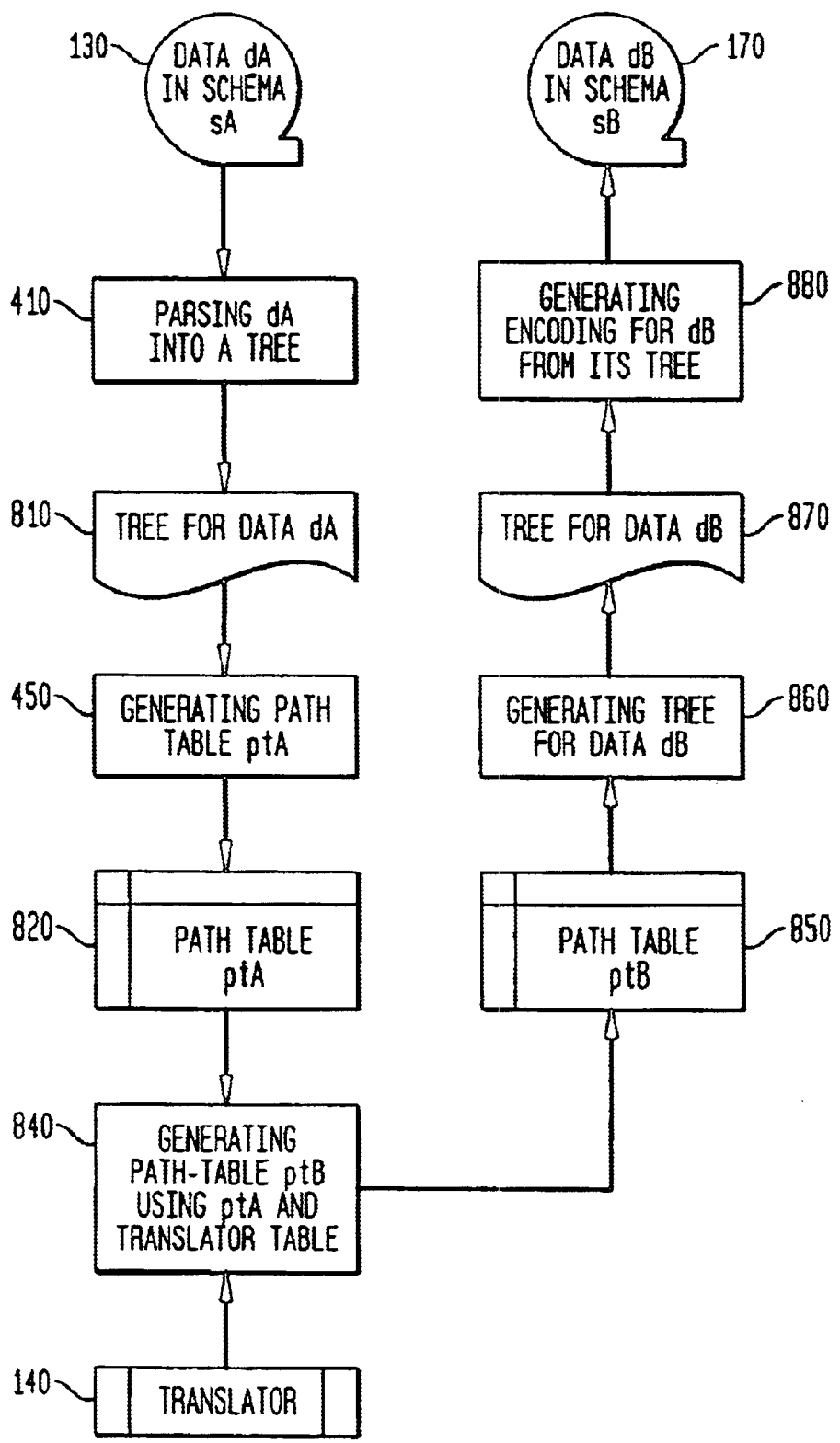
FIG. 8 shows the flowchart of the translation algorithm using the translator to translate data from one schema to another.

FIG. 8 depicts an example of a logic flowchart for translating data (260) from schema sA (120) to schema sB (160) using the translator (140). As depicted, a data dA (130), encoded in schema sA (120) of system A (110) is input to the process. In step 410, the data dA (130) is parsed into a tree (810). In step 450, a path-table ptA (820) is generated from the tree (810) as described previously. Every time the process reaches a leaf node containing a data element, it adds to the path-table ptA (FIG. 9, 820) an entry which includes the data element (FIG. 9, 921) and the path (FIG. 9, 922) from the root to that leaf node. For example, in FIG. 9, for the data item y1 (917), an entry is added to the path table ptA (820) including the data element y1 (917) and its path pA1=a.b.c (924). Similarly, for the data element y2 (918), an entry is added for the path pA2=a.b.d.e (926). This process continues until all the leaf nodes of the tree (810) have been reached and entered in the path-table ptA (820). In step 840, a path-table ptB (850) is generated from the path-table ptA (820) and the translator (140) table. This step (840) is described in more detail in FIG. 10. In step 860, the path-table ptB (850) is then used for generating a tree (870) for data dB. This step (860) is described in more detail in FIG. 11. In step 880, the tree (870) is used for generating an encoding for the data dB (170) in schema sB (160). Methods for generating data encodings from trees are well known in the art. The resulting data dB (170) is the desired translation of data dA (130) in schema sA (120) into schema sB (170).

Figure 9:
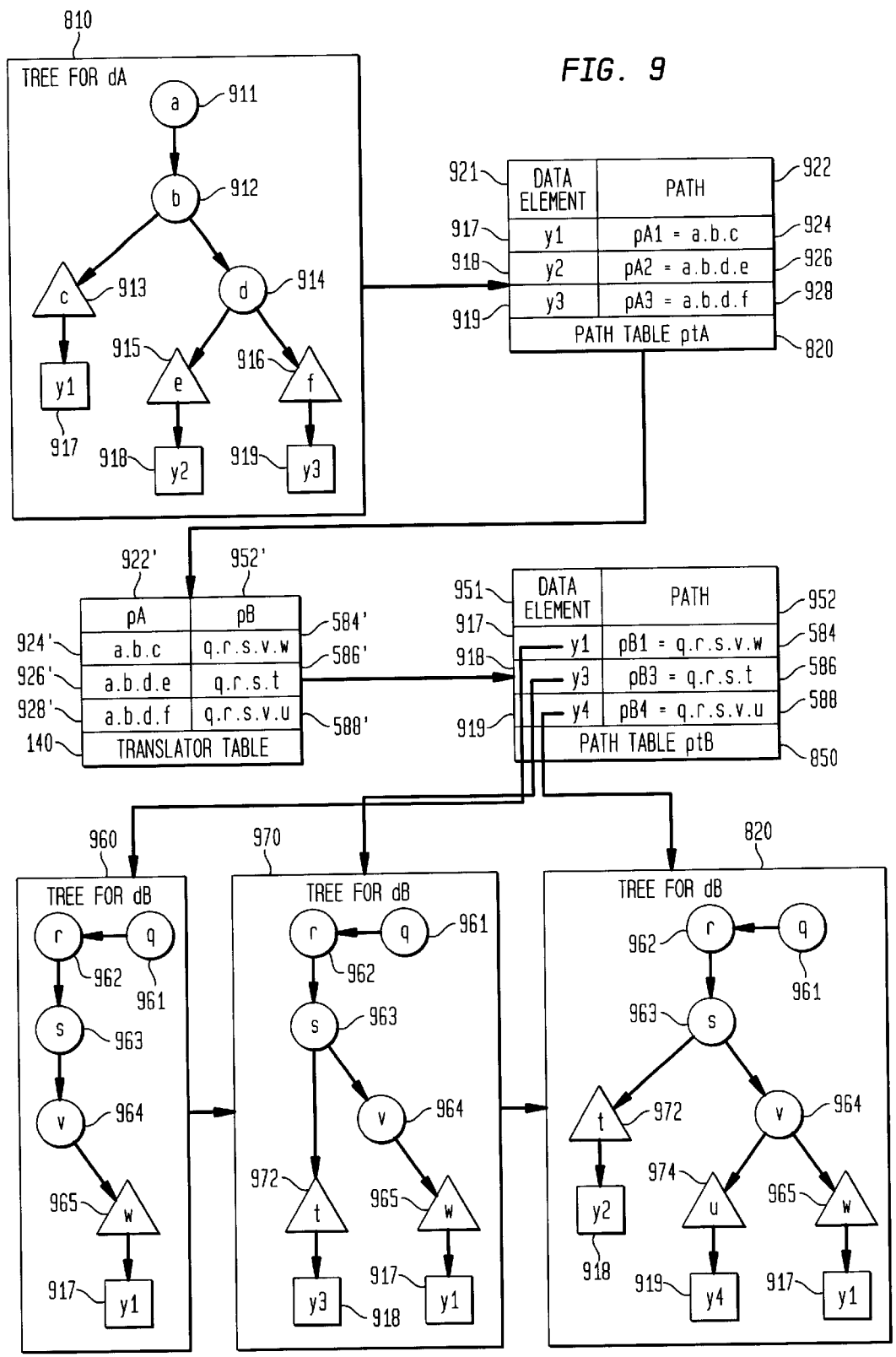
FIG. 9 shows examples of data, path tables, trees and translator table.
Figure 10:
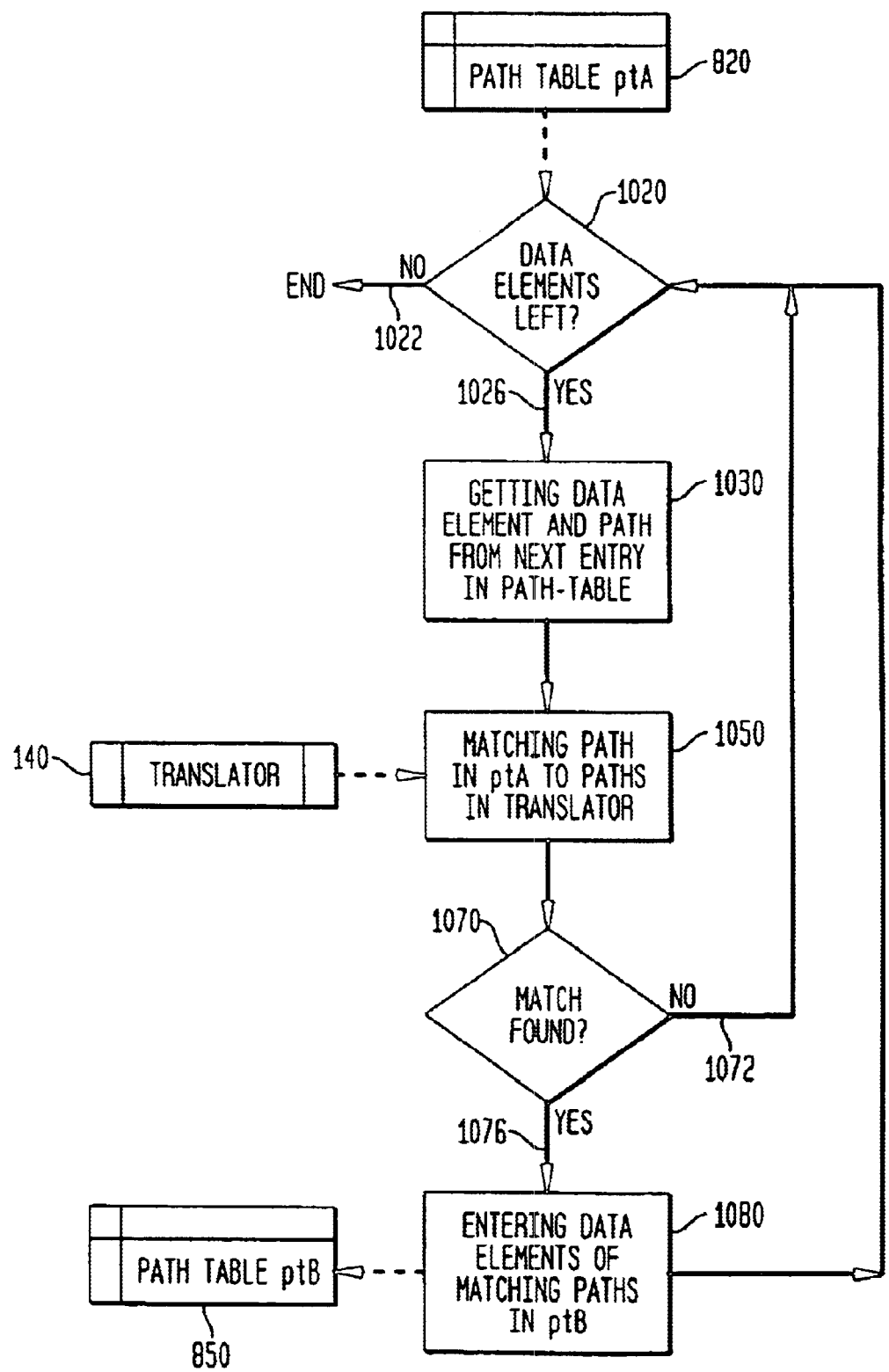
FIG. 10 shows the flowchart for creating a path table from another path table using the translator.

FIG. 10 depicts an example of a logic flowchart for generating path-table ptB (850) from the path table ptA (820) and the translator (140) table (FIG. 8, step 840). As depicted, in step 1020, it is checked whether any entries in path-table ptA (820) have not been processed. If there are unprocessed entries (1026) then the first is selected from the remaining unprocessed entries. In step 1030, the data element (FIG. 9, 921) and the path (FIG. 9, 922) are obtained from the entry. This path is then matched (1050) against paths pA (FIG. 9, 922') in the translator (140) table. In step 1070, if a match is found (1076), the corresponding path entry pB (FIG. 9, 952') from the translator (140) table and the data element (FIG. 9, 921) from the entry in ptA (FIG.

9, 820) is entered, in step 1080, in path-table ptB (FIG. 9, 850). For example, in FIG. 9, the path a.b.c (924) in ptA (820) matches path a.b.c (924') in translator (140) table. The matching path a.b.c (924') has the corresponding pB (952') entry q.r.s.v.w (584'). The data element y1 (917) from ptA (820) and the matching path pB=q.r.s.v.w (584') retrieved from the translator (140) table are entered into path-table ptB (850). The steps 1020, 1030, 1050, 1070 and 1080 are repeated until all entries in path table ptA (820) are processed. When no (1022) more unprocessed entries are left, the algorithm (840) terminates and the path-table ptB (850) is complete.

Figure 11:
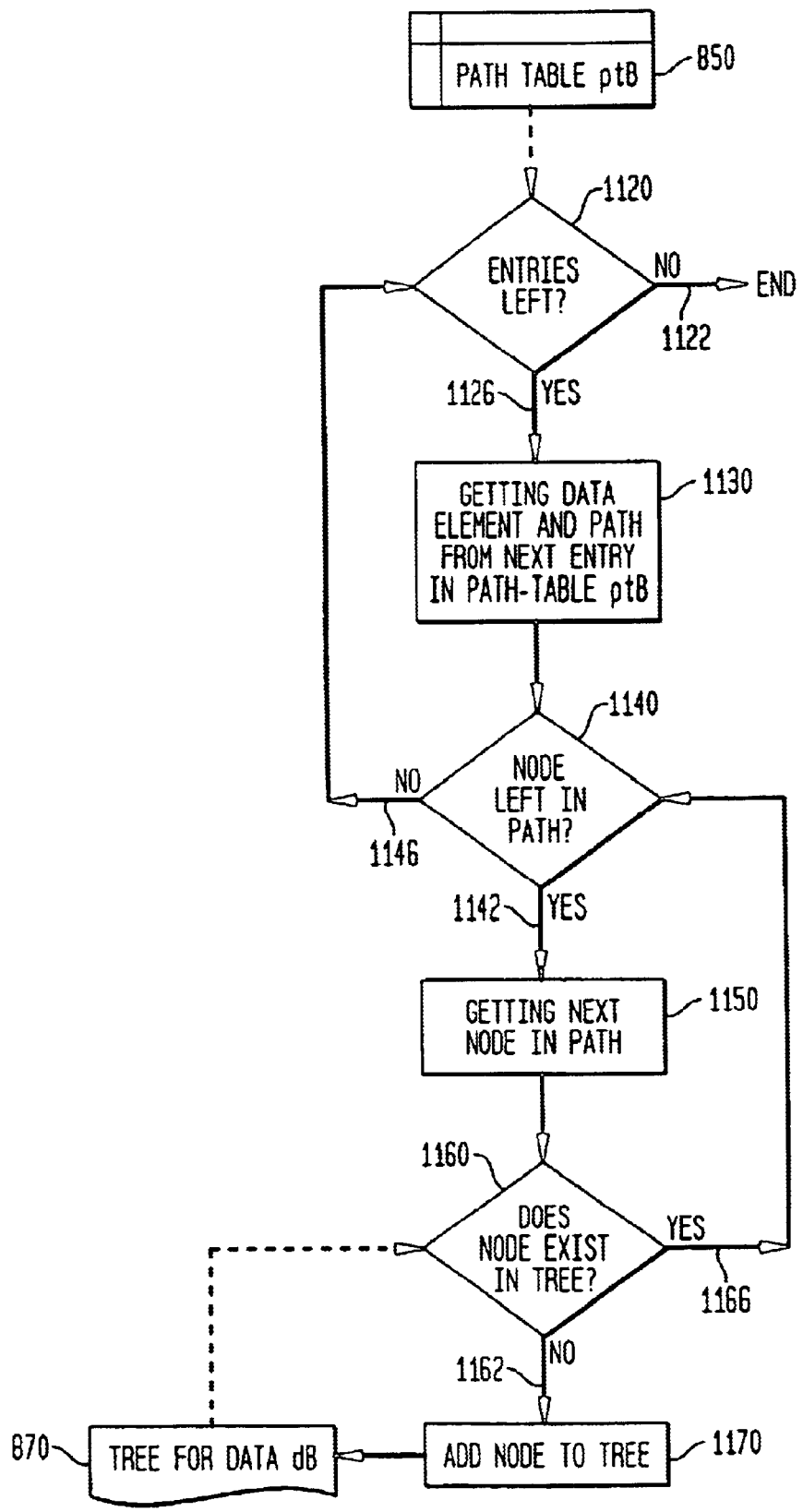
FIG. 11 shows the flowchart for the creation of a tree from a path table.

FIG. 11 depicts an example of a logic flowchart for constructing the tree (FIG. 8, steps 860–870) for the translated data dB (170). The process starts with an empty tree. As depicted, in step 1120, the process takes as input the path table ptB (850) and checks (1120) if any entries in path-table ptB (850) have not been processed. If there are unprocessed entries (1126) then it selects the first from the remaining unprocessed entries. In step 1130, it gets (1130) the data element (FIG. 9, 951) and the path (FIG. 9, 952) from the entry. In step 1140, it is checked (1140) whether there are any nodes in the path (952) that have not been processed. If there are unprocessed nodes (1142), then the first node is selected from the remaining unprocessed nodes. In step 1160, it is then checked to see if this unprocessed node exists in the tree (870) being constructed. If the node does not exist (1162) in the tree (870), in step 1170, the node is added at the path up to that node in the tree (870). For example, in FIG. 9, the first entry in ptB (850) has data-element y1 (917) and path pB=q.r.s.v.w (584). Since this is the first entry considered, the tree (870) is empty. The nodes q (961), r (962), s (963), v (964) and leaf node w (965) with data element y1 (917) are iteratively added to give the partial tree (960) for dB. Next, the entry y3 (918) with path q.r.s.t (586) is considered. Since nodes q (961), r (962) and s (963) already exist, the leaf node t (972) with data element y2 (918) are added to the partial tree (960) to get the updated partial tree (970). Similarly, for entry y4 (919) with path q.r.s.v.u (588), leaf node u (974) with data y4 (919) are added to tree (970) to get the updated tree (820) for dB. In step 1120, once all the entries (1122) from path-table ptB (850) have been added to the data tree (870), the resulting tree (870) is complete and the process ends (1122).

Figure 12:
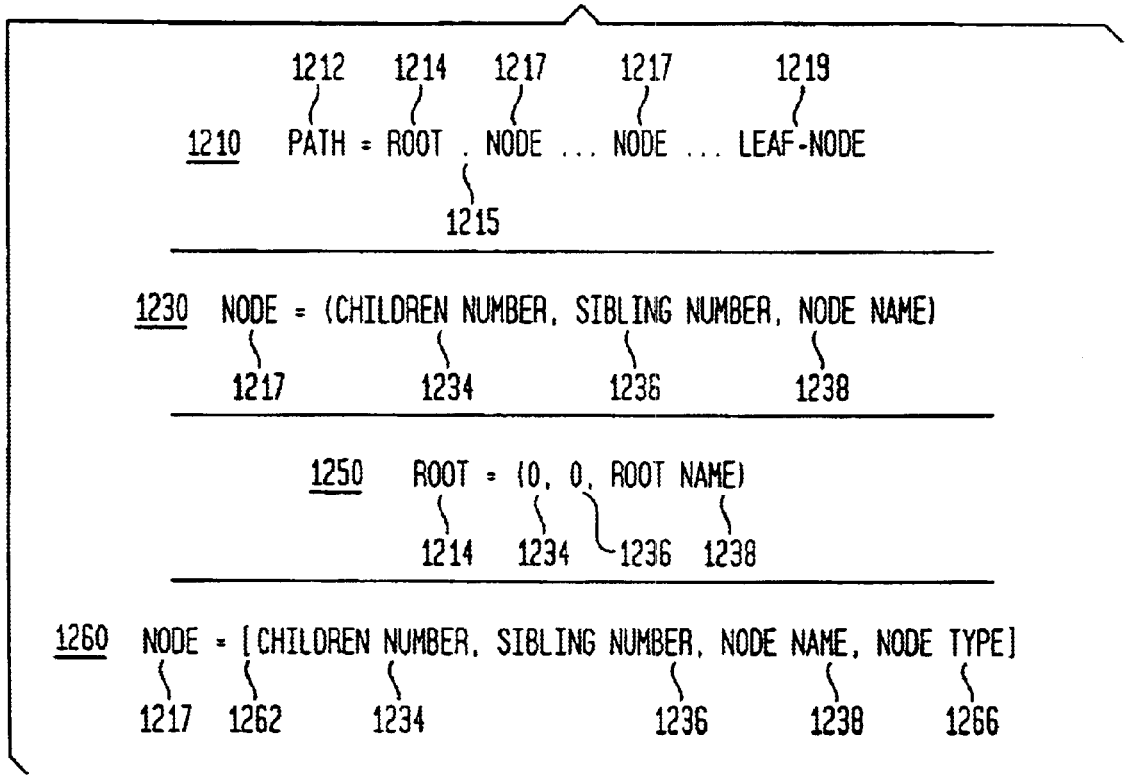
FIG. 12 shows the extended path data structure.

FIG. 12 depicts an example of a path data structure. As depicted, each path (1210) is a sequence of nodes separated by a delimiter (1215). The path starts with a root node (1214) and is followed by one or more nodes (1217) with a leaf node (1219) at the end. Each node (1217) is described (1230) as a sequence of children number (1234), sibling number (1236) and node name (1238). The children number (1234) is the position number of the node in the children of its parent (reference "Knuth") when traversed left-to-right. The sibling number (1236) is the position of the node among the nodes with the same name among the children of its parent. The node name (1238) is the name of the node. The children number (1234) and the sibling number (1236) are optional. The root node (1214) is distinguished (see 1250) by having specific values for the children number (1232) and sibling number (1232); for example root (1214) has children number (1234) equal to 0 and sibling number (1236) equal to 0. In certain formats, such as XML and HTML, there may be different types of nodes, such as element and attribute. In such cases, the nodes (1217) may be further distinguished by the additional entry of node type (1266), and/or by the use of a different delimiter (1262).

The reason for using extended paths 1210, 1230, 1260 is that in many data schemas the field names, which correspond to the node names, may be repeated. The children number (1234) and sibling number (1236) help distinguish between different instances of nodes with the same name. There are notations like XPointer (reference "W3C") that have similar syntax for defining paths.

The example (310) or, set of examples, in FIG. 3 should be sufficiently descriptive to cover all possible paths that may be encountered in the trees for the data dA (130) in schema sA (120) and data dB (170) in schema sB (160). When the schemas sA (120) or sB (160) have repeating elements, such examples may not be available. In this case, the repeating elements are either deduced from the examples or described by the machine readable schemas sA (120) and sB (160). A number of heuristic algorithms can be used to determine the path translation for paths not seen in the examples.

Figures 13, 14:
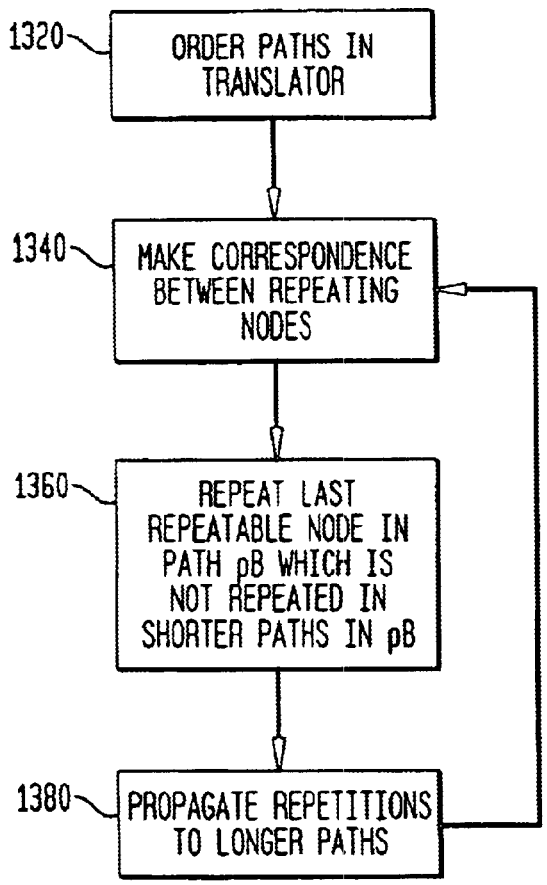
FIG. 13 shows the flowchart for handling repetition in nodes.
FIG. 14 shows an example of a translator for repeated nodes.

FIG. 13 depicts an example of a logic flowchart for handling repeated elements/nodes. As depicted, in step 1320, the paths in the translator (140) table are ordered (1320) in order of increasing length of paths pA (FIG. 9, 922'). In step 1340, starting from the shortest path in pA (922') a correspondence is made between the repeating nodes in pA (922') and pB (952'). The last repeatable node in pB (952') is repeated, in step 1360, for any repeats in nodes in its corresponding path in pA (922'), which are not repeated in shorter paths in pB (922'). One way of repeating a node is to increment its sibling number (FIG. 12, 1236). In step 1380, these repetitions are propagated (1380) to longer paths in pA (922') and pB (952').

For example, in FIG. 14, The path a.b.c* (1410) has c* (1416) as the repeating element and the path p.q.r* (1420) has r* (1426) as the repeating element. Path a.b.c* (1410) is the shortest in column pA (572"). So, the process (FIG. 13) first makes the correspondence (step 1340) that with each path a.b.c* (1410) with an increment of sibling number (FIG. 12, 1236) in c* (1416), a new path p.q.r* (1420) in column pA (582") is generated with an increment (1360) in the sibling number of r* (1426). Once this correspondence is made, for path a.b.c*.d* (1430), any increment in the sibling number (1236) of c* leads to an increment (step 1360) in the sibling number (1236) for r* in path p.q.r*.s.t* (1440) and any increment in the sibling number (1236) of d* leads to an increment (step 1360) in the sibling number (1236) of t*. In the path translator table, path a.e*.f* (1450) has corresponding path p.u* (1460). For every path a.e*.f* (1450) ordered with f* (1454) incrementing faster than e* (as would be the case in a preorder traversal), an new path p.u* (1460) is created by incrementing the sibling number (1236) for u*.

Given a number of paths in the translator (140) table, certain mathematical relationships between the sibling numbers of the repeating nodes of paths pA (922') and paths pB (952') can also be deduced.

Figure 15:
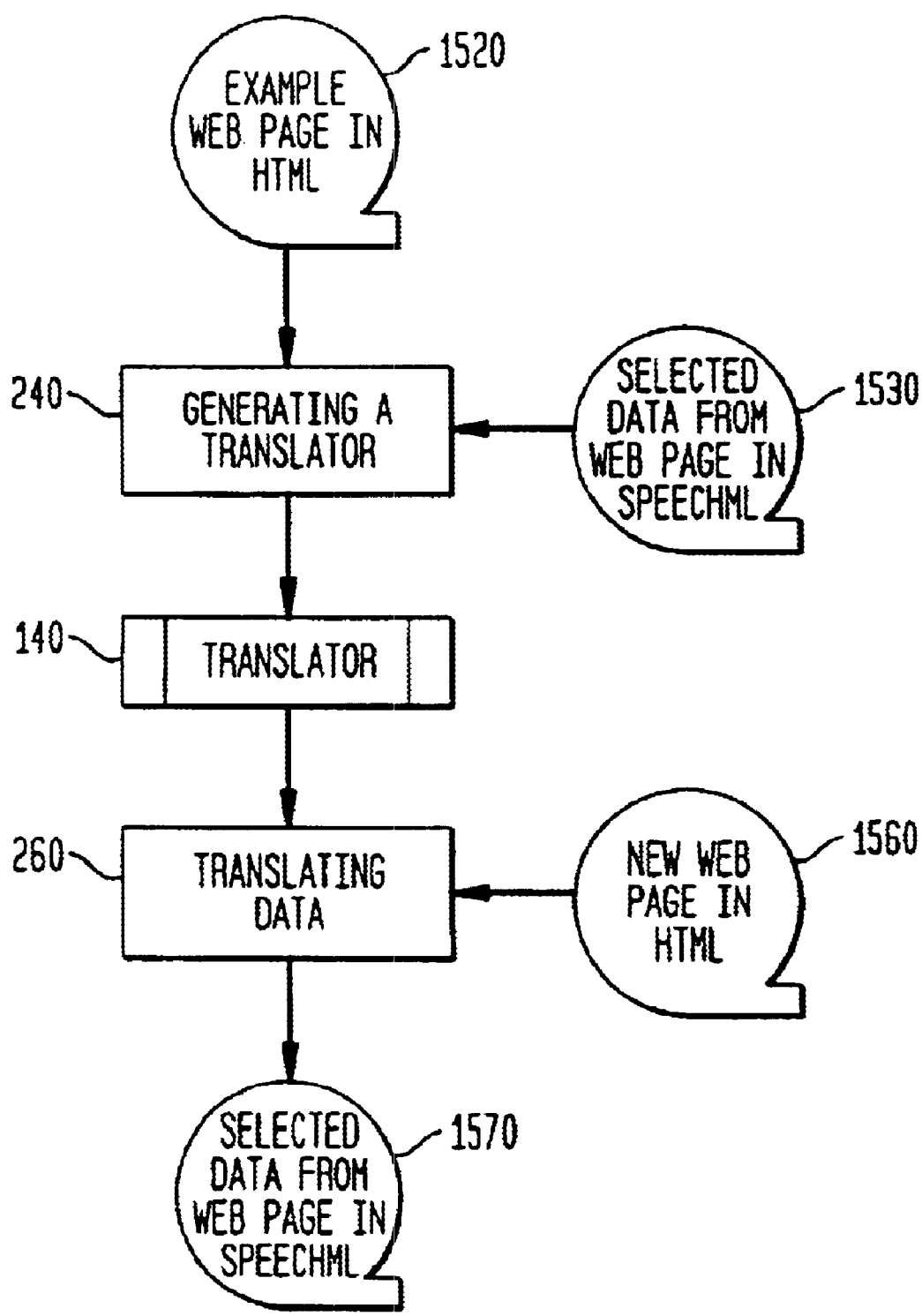

FIG. 15 depicts a logical flowchart for an example application of the current invention. The application is to translate data from a Web page, such as a page from a news site, that is authored in one representation schema, namely HTML into data represented in another representation schema, namely SpeechML. HTML is a representation schema suitable for data that is viewed on a Web browser. SpeechML is another representation, suitable for voice based browsers that may be used in automobiles (where a visual browser may be inappropriate for the driver) or over the phone. An example (1520) of the Web page to be translated is chosen. Some of the data in it is then represented in SpeechML, creating a common example data in SpeechML (1530). In 1530, some data from 1520, such as images, may be ignored. In step 140, the examples 1520 and 1530, sharing common data are used to generate a translator (140). On another date, a Web page (1560) is obtained from the same site and location from which the example 1520 was obtained. 1560 may have different data in it than 1520 as news typically changes with time. The step 260 is then used to translate the data represented in HTML in the Web page 1560 to data represented in SpeechML 1570. Thus, the current news available from the web site has been translated and can be used with a voice browser in an automobile or over a phone. Data, such as images, which was ignored in forming the example 1530 from 1520, will automatically be ignored in the translation of 1560 to 1570.

One skilled in the art will appreciate that sometimes, nodes in a tree may not have semantic implications for the data elements. For example, in HTML, nodes with font instructions, such as <B> . . . </B> may not have implications on the meaning of the contents. To deal with such cases, an exclusion list can be made of nodes that can be excluded in the paths pA (572') and pB (582') computed or used in the path-tables and the translator (140) tables.

By way of further example, consider the following example of a translation process between data, in this case date, between two schemas du and di.

Example 1. Date in schema du in XML:

```
<?xml version="1.0"?>
<!DOCTYPE date-us SYSTEM "du.dtd">
<date-us cal="European">
    <m extra1="extra stuff 1">1</m>
    <d>
        7
        <t>5 pm</t>
    </d>
    <y>99</y>
    <ct>1900</ct>
</date-us>
```

Its schema or DTD du:

```
<?xml version="1.0"encoding="UTF-8"? >
<!ELEMENT date-us (m, d, y, ct)>
<!ATTLIST date-us
    cal CDATA #REQUIRED>
<!ELEMENT m(#PCDATA)>
<!ATTLIST m
    extra1 CDATA #IMPLIED>
<!ELEMENT d (#PCDAT | t)*>
<!ELEMENT t (#PCDATA)>
<!ELEMENT y (#PCDATA)>
<!ELEMENT ct (#PCDATA)>
```

Example 2. Same date as in example 1 encoded in schema di in XML:

```
<?xml version="1.0"?>
<!DOCTYPE date SYSTEM "di.dtd">
<date>
    <day>7</day>
    <month>
        1
        <time>5 pm</time>
    </month>
    <year century="1900"calendar="European">99</year>
</date>
```

The schema or DTD for Example 2:

```
<?xml version="1.0"encoding="UTF#8" ?>
<!ELEMENT date (day, month, year)>
<!ELEMENT day (#PCDATA)>
<!ELEMENT month (#PCDATA | time)*>
<!ELEMENT time (#PCDATA)>
<!ELEMENT year (#PCDATA)>
<!ATTLIST year
```

-continued

```
    century CDATA #REQUIRED
    calendar CDATA #REQUIRED>
```

The translation table created by using Example 1 and 2 of the shared date data to translate dates in schema du to dates in schema di. The odd lines are paths to data in schema du and the even lines are the corresponding paths to the data in schema di:

```
[(0,#element,date-us), (0,#element,d), (0,#text,#string)]
[(0,0,#element,date), (0,0,#element,day), (0,0,#text,#string)]
[(0,#element,date-us), (0,#element,d), (0,#element,t), (0,#text,#string)]
[(0,0,#element, date), (1,0,#element,month), (1,0,#element,time),
(0,0,#text,#string)]
[(0,#element, date-us), (0,#element,y), (0,#text,#string)]
[(0,0,#element,date), (2,0,#element,year), (0,0,#text,#string)]
[(0,#element, date-us), (0,#element,m), (0,#text,#string)]
[(0,0,#element,date), (1,0,#element,month), (0,0,#text,#string)]
[(0,#element,date-us), (0,#element,ct), (0,#text,#string)]
[(0,0,#element,date), (2,0,#element,year), (0,0,#attr,century)]
[(0,#element,date-us), (0,#attr,cal)]
[(0,0,#element,date), (2,0,#element,year), (1,0,#attr,calendar)]
```

A new date in schema du:

```
<?xml version="1.0"?>
<!DOCTYPE date-us SYSTEM "du.dtd">
<date-us cal="European">
    <m extra1="extra new">5</m>
    <d>
        23
        <t>8 am</t>
    </d>
    <y>01</y>
    <ct>2000</ct>
</date-us>
```

Gets translated to the following date in schema di using the above translation table:

```
<? xml version="1.0"? >
<date>
    <day>23</day>
    <month>5<time>8 am</time>
    </month>
    <#year century="2000"calendar="European ">01 </year>
</date>
```

Referring again to the Figures, in the data representations dA (130) or dB (170), any data in dB that is not a part of the example (310), or is not common between dA1 (220) and dB1 (230), can be copied in the translator (140) by being stored in the paths in the translator (140) table.

One skilled in the art will appreciate that a number of data items in different data representation schemas can be translated together into a new data item. There may be one or more shared examples represented by the data items that get transformed. There also may be example data items that have been translated by other means into one new data item.

In addition to standardizing the example of data schema transformation, additional automatic translation assistance can be achieved through the following mechanisms:

1. Valid range for numerical attribute: By describing the valid range of a numerical attribute, attributes with similar or identical attributes can be grouped together or matched against one another.

2. Statistical distribution of the attributes: By publishing the first order statistics (such as the mean), the second order statistics (such as variance), and/or higher order statistics, attributes with similar statistics can then be matched against each other.

3. Implicit ontology description through classifier and training set: Instead of publishing the standardized ontology (e.g. mountain, terrain, flat region), an alternative way is to publish the classifier in conjunction with a training set (i.e. a set of input/output pairs for training the classifier). This mechanism is particularly useful for achieving semantic interpretability for nonstructural data (such as images and video).

A preferred embodiment of the present invention includes features implemented as software tangibly embodied on a computer program product or program storage device for execution on a processor (not shown) provided with System A (110) or System B (150). For example, software implemented in a popular object-oriented computer executable code such as JAVA provides portability across different platforms. Those skilled in the art will appreciate that other procedure-oriented and/or object-oriented (OO) programming environments, such as C++ and Smalltalk can also be employed.

Those skilled in the art will also appreciate that methods of the present invention may be implemented as software for execution on a computer or other processor-based device. The software may be embodied on a magnetic, electrical, optical, or other persistent program and/or data storage device, including but not limited to: magnetic disks, DASD, bubble memory; tape; optical disks such as CD-ROMs; and other persistent (also called nonvolatile) storage devices such as core, ROM, PROM, flash memory, or battery backed RAM. Those skilled in the art will appreciate that within the spirit and scope of the present invention, one or more of the components instantiated in core computer memory could be accessed and maintained directly via: data storage devices; a network; another server; or could be distributed across a plurality of servers.

Now that a preferred embodiment of the invention has been described, one skilled in the relevant art will recognize that equivalents, modifications and improvements may be made without departing from the spirit and scope of the invention as set forth in the appended claims.

REFERENCES CITED

[Knuth] Donald E. Knuth, "The Art of Computer Programming," Second Edition, Addison-Wesley Publications, 1979.

[W3C] World Wide Web Consortium. http://www.w3c.org/xml. "Extensible Markup Language (XML) 1.0" (W3C Recommendation Feb. 10, 1998). http://www.w3.org/TR/1998/REC-xml-19980210.

What is claimed is:

1. A method for data representation schema translation, said method comprising the steps of:
   identifying one or more shared examples encoded in two data representation schemas; and
   automatically generating a translator based on said shared examples, wherein said translator is adapted for translating data between said two data representation schemas.

2. The method of claim 1, further comprising the steps of:
   parsing data in said one or more shared examples into trees, each tree representing one of said data representation schemas;
   generating a path table for said each tree, in response to said parsing step; and
   said step of automatically generating the translator comprising the step of generating a translation table from path tables generated for said each tree.

3. The method of claim 1, where said data representation schema is a hierarchical data representation language selected from the group consisting of XML; HTML; and SGML.

4. The method of claim 3, wherein said shared examples have different values for each attribute and element.

5. The method of claim 2, wherein said shared examples are sufficient to cover all paths that may be encountered in any data that needs to be translated between the two schemas.

6. The method of claim 2, wherein said step of automatically generating the translator further comprises the step of storing a path in a specific traversal in each of said data representation schemas for each data item in each shared example.

7. The method of claim 2, further comprising the step of
   receiving a data item in a first data representation schema;
   identifying the path associated with the data item;
   identifying an equivalent path in a second data representation, based on the translation table; and
   translating the data item to the second data representation, based on the equivalent path.

8. The method of claim 7, further comprising the step of matching paths if parts of the path are matched.

9. The method of claim 7, further comprising the step of identifying paths by a list of nodes in the path from the root of the data item.

10. The method of claim 6, further comprising the step of storing additional path information including one or more of a node order among its siblings; and a node order in siblings of the same type.

11. The method of claim 1, wherein said shared examples have a different value for each part.

12. The method of claim 1, wherein said data representation schemas are machine readable.

13. The method of claim 1, further comprising the step of generating a translator table for translating between said data representation schemas by using common elements of said shared examples.

14. The method of claim 1, further comprising the step of copying parts of the data representation in one of said data representation schemas in the translation.

15. The method of claim 1, wherein said data representation schema is in the form of a graph, further comprising the step of converting the graph to an equivalent tree.

16. A program storage device readable by a machine, tangibly embodying a program of instructions executable by the machine to perform method steps for data representation schema translation, said method steps comprising:
   identifying one or more shared examples encoded in two data representation schemas; and
   automatically generating a translator based on said shared examples, wherein said translator is adapted for translating data between said two data representation schemas.

17. The program storage device of claim 16, further comprising the steps of:
   parsing data in said one or more shared examples into trees, each tree representing one of said data representation schemas;
   generating a path table for said each tree, in response to said parsing step; and said step of automatically generating the translator comprising the step of generating a translation table from path tables generated for said each tree.

18. The program storage device of claim 16, where said data representation schema is a hierarchical data representation language selected from the group consisting of:
XML; HTML; and SGML.

19. The program storage device of claim 18, wherein said shared examples have different values for each attribute and element.

20. The program storage device of claim 17, wherein said shared examples are sufficient to cover all paths that may be encountered in any data that needs to be translated between the two schemas.

21. The program storage device of claim 17, wherein said step of automatically generating the translator further comprises the step of storing a path in a specific traversal in each of said data representation schemas for each data item in each shared example.

22. The program storage device of claim 21, further comprising the step of
receiving a data item in a first data representation schema;
identifying the path associated with the data item;
identifying an equivalent path in a second data representation, based on the translation table; and
translating the data item to the second data representation, based on the equivalent path.

23. The program storage device of claim 22, further comprising the step of matching paths if parts of the path are matched.

24. The program storage device of claim 22, further comprising the step of identifying paths by a list of nodes in the path from the root of the data item.

25. The program storage device of claim 21, further comprising the step of storing additional path information including one or more of: a node order among its siblings; and a node order in siblings of the same type.

26. The program storage device of claim 16, wherein said shared examples have a different value for each part.

27. The program storage device of claim 16, wherein said data representation schemas are machine readable.

28. The program storage device of claim 16, further comprising the step of generating a translator table for translating between said data representation schemas by using common elements of said shared examples.

29. The program storage device of claim 16, further comprising the step of copying parts of the data representation in one of said data representation schemas in the translation.

30. The program storage device of claim 16, wherein said data representation schema is in the form of a graph, further comprising the steps of converting the graph to an equivalent tree.

31. A computer program product comprising:
a computer usable medium having computer readable program code means embodied therein for causing a data representation schema translation, the computer readable program code means in said computer program product comprising:
computer readable program code means for causing a computer to effect, identifying one or more shared examples encoded in two data representation schemas; and
computer readable program code means for causing a computer to effect, automatically generating a translator based on said shared examples, wherein said translator is adapted for translating data between said two data representation schemas.

32. The computer program product of claim 31, further comprising:
computer readable program code means for causing a computer to effect, parsing data in said one or more shared examples into trees, each tree representing one of said data representation schemas;
computer readable program code means for causing a computer to effect, generating a path table for said each tree, in response to said parsing step; and
said computer readable program code means for causing a computer to effect, automatically generating the translator comprising computer readable program code means for causing a computer to effect, generating a translation table from path tables generated for said each tree.

33. A method for data representation schema translation, said method comprising the steps of:
identifying data encoded in a first data representation schema;
converting said data encoded in said first data representation schema to an encoding in a second data representation schema; and
automatically generating a translator based on common data encodings, in response to said identifying and converting, wherein said translator is adapted for translating data between said first data representation schema and said second data representation schema.

34. A program storage device readable by a machine, tangibly embodying a program of instructions executable by the machine to perform method steps for data representation schema translation, said method steps comprising:
identifying data encoded in a first data representation schema;
converting said data encoded in said first data representation schema to an encoding in a second data representation schema; and
automatically generating a translator based on common data encodings, in response to said identifying and converting, wherein said translator is adapted for translating data between said first data representation schema and said second data representation schema.

35. A computer program product comprising:
a computer usable medium having computer readable program code means embodied therein for causing a for data representation schema translation, the computer readable program code means in said computer program product comprising:
computer readable program code means for causing a computer to effect, identifying data encoded in a first data representation schema;
computer readable program code means for causing a computer to effect, converting said data encoded in said first data representation schema to an encoding in a second data representation schema; and
computer readable program code means for causing a computer to effect, automatically generating a translator based on common data encodings, in response to said identifying and converting, wherein said translator is adapted for translating data between said first data representation schema and said second data representation schema.

36. A method for translating data from a Web page represented in one data representation schema to another data representation schema, said method comprising the steps of:

identifying one or more shared examples of the Web page encoded in both data representation schemas; and automatically generating a translator based on said shared examples, wherein said translator is adapted for translating data from the Web page between said data representation schemas.

37. The method of claim 36, further comprising the steps of:

receiving another Web page including different data; and translating the different data in the Web page represented in said one data representation schema to said another data representation schema.

38. The method of claim 36 wherein the Web page in said one data representation schema includes data in a HTML schema and said another data representation schema includes data in a XML schema.

39. The method of claim 38 wherein said XML schema includes data in a SpeechML schema.

40. The method of claim 39, further comprising the steps of:

receiving another Web page in said XML schema including different data; and translating the different data in the Web page represented said XML schema to said SpeechML schema.

41. The method of claim 39, for use with a voice browser in onr or more of an automobile and over a telephone.

42. A program storage device readable by a machine, tangibly embodying a program of instructions executable by the machine to perform method steps for data representation schema translation, said method steps comprising:

identifying one or more shared examples of the Web page encoded in both data representation schemas; and automatically generating a translator based on said shared examples, wherein said translator is adapted for translating data from the Web page between said data representation schemas.

43. The program storage device of claim 42, further comprising the steps of:

receiving another Web page including different data; and translating the different data in the Web page represented in said one data representation schema to said another data representation schema.

44. The program storage device of claim 42 wherein the Web page in said one data representation schema includes data in a HTML schema and said another data representation schema includes data in a XML schema.

45. The program storage device of claim 44 wherein said XML schema includes data in a SpeechML schema.

46. The program storage device of claim 45, further comprising the steps of:

receiving another Web page in said XML schema including different data; and translating the different data in the Web page represented said XML schema to said SpeechML schema.

47. The program storage device of claim 45, for use with a voice browser in one or more of an automobile and over a telephone.

* * * * *